Abuel-Haj

United States Patent

[15] 3,671,521
[45] June 20, 1972

[54] 2-HETEROCYCLIC SUBSTITUTED QUINXALINE-1, 4-DIOXIDES

[72] Inventor: Marwan J. Abuel-Haj, Groton, Conn.

[73] Assignee: Pfizer Inc., New York, N.Y.

[22] Filed: March 18, 1970

[21] Appl. No.: 20,842

[52] U.S. Cl. ............. 260/244 R, 260/239 BC, 260/243 R, 260/250 R, 260/251 R, 260/306.7, 260/307 F, 260/309.6, 260/327 R, 260/333, 260/999
[51] Int. Cl. ............. C07d 51/78, C07d 87/14, C07d 85/36
[58] Field of Search ................................. 260/244 R, 250 R

[56] References Cited

FOREIGN PATENTS OR APPLICATIONS 521,330   1/1956   Canada ............................ 260/250 R
1,521,907 4/1968   France ............................ 260/250 R

OTHER PUBLICATIONS

Bobowski et al. J. Org. Chem. Vol. 32, pages 956 & 959 relied on (1967) QD241.J6
Chen et al. Chem Abst. Vol. 69, No. 19120k (1968). QD1.A51
Gershuns et al. Chem. Abst. Vol. 72, No. 31672m (1970). QD1.A51
Giammanco Chem. Abst. Vol. 52, column 10055 (1958). QD1.A51

*Primary Examiner*—Natalie Trousof
*Attorney*—Connolly and Hutz

[57] ABSTRACT

The 2-heterocyclic- and 2-[N-(ω-haloalkyl)carbamyl]substituted quinoxaline-1,4-dioxides having formulas I and II, respectively:

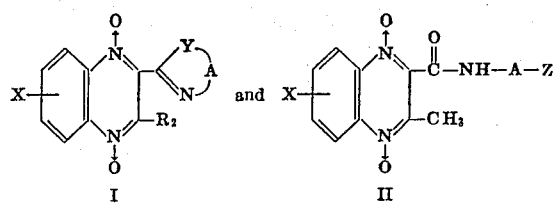

wherein X is a 6- or a 7-position substituent and is hydrogen, chloro, bromo, fluoro, methyl, methoxy and trifluoromethyl;

Y is O, S and $NR_1$ wherein $R_1$ is hydrogen and lower alkyl;

A is alkylene of from two to five carbon atoms which places at least two carbon atoms between the N and Y or Z atoms to which it is attached;

$R_2$ is lower alkyl;

Z is chloro and bromo;

the non-toxic acid addition salts of those compounds wherein Y is $-NR_1$; and methods for their preparation are described. All compounds of formulas I and II are useful as antibacterial agents and many of them are effective animal growth promotants. Compounds of formula II are valuable intermediates for further synthesis.

6 Claims, No Drawings

2-HETEROCYCLIC SUBSTITUTED QUINXALINE-1, 4-DIOXIDES

BACKGROUND OF THE INVENTION

This invention relates to novel 2-heterocyclic substituted quinoxaline-1,4-dioxides which are useful antibacterial agents. Many of the compounds described herein are of value as animal growth promotants and as intermediates for further synthesis.

The unceasing quest for antibacterial agents has resulted in the production of a wide variety of structural types of organic compounds, including many derivatives of quinoxaline-1,4-dioxides. A series of 2-methyl-3-amidinoquinoxaline-1,4-dioxides having antibacterial activity is described in Belgian Pat. No. 721,727, published Apr. 2, 1969. A variety of 2-quinoxalinecarboxamide-1,4-dioxides is also described in the recent patent literature.

French Pat. No. M3717, granted Jan. 3, 1966, generically discloses 2-quinoxalinecarboxamide-1,4-dioxides in which the carboxamide group may be substituted with an alkyl, substituted alkyl, aryl, cycloalkyl, aralkyl, or cycloalkylalkyl group; or may form a heterocyclic amide, e.g., a piperidide. They are reported to be of use in human therapy as antitubercular, antibacterial, anticancer, antivirus and antiprotozoal agents.

Belgian Pat. No. 697,976, granted Nov. 3, 1967, describes a variety of N-substituted derivatives of 3-methyl-2-quinoxalinecarboxamide-1,4-dioxide in which the N-substituent is phenyl, substituted phenyl, dodecyl or ethyl. Also disclosed are cyclic amides, e.g., pyrrolidide and piperidide. They are said to be of value as intermediates for the preparation of vegetation protection agents and pharmaceutical agents. Belgian Pat. Nos. 721,724; 721,725; 721,726; and 721,728; published Apr. 2, 1969, describe a variety of N-substituted 3-methyl-2-quinoxalinecarboxamide-1,4-dioxide derivatives wherein the N-substituent is hydroxyalkyl, lower alkoxyalkyl, carbalkoxyalkyl, monoalkylaminoalkyl or di(alkyl)aminoalkyl which are useful as antibacterial agents.

SUMMARY OF THE INVENTION

It has now been found that novel 2-heterocyclic substituted quinoxaline-1,4-dioxides and intermediates therefor having formulas I and II, respectively:

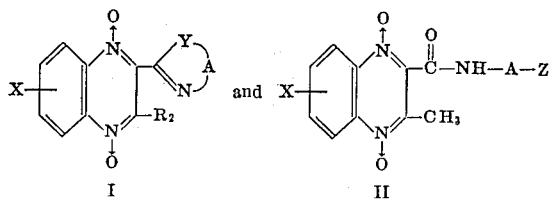

wherein X is a 6- or a 7-position substituent and is selected from the group consisting of hydrogen, chloro, bromo, fluoro, methyl, methoxy and trifluoromethyl;

Z is selected from the group consisting of chloro and bromo;

Y is selected from the group consisting of O, S and NR$_1$ wherein R$_1$ is selected from the group consisting of hydrogen and lower alkyl;

A is alkylene of from two to five carbon atoms which places at least two carbon atoms between the N and Y or Z atoms to which it is attached;

R$_2$ is lower alkyl;

and the non-toxic acid addition salts of those compounds wherein Y is

-NR$_1$; are effective broad spectrum antibacterial agents in vitro. Further, many of the compounds described herein are valuable broad spectrum antibacterial agents in vivo and/or efficient animal growth promotants, especially for swine. Such broad spectrum antibacterial activity is in contrast to the gramnegative activity exhibited by most of the currently available quinoxaline-1,4-dioxides. Still further, the compounds of formula II are useful as intermediates for the synthesis of other antibacterial agents as is described below.

By the term "lower alkyl" as used herein is meant those alkyl groups containing from one to four carbon atoms since the compounds bearing such groups are conveniently prepared from easily available reactants.

The substituents on the fused benzene moiety of the above compounds can vary widely. For example, at least one of the following substituents can be present: hydrogen, lower alkyl, lower alkoxy, chloro, bromo, fluoro, tri-fluoromethyl, di(lower alkyl)amino, amino, carboxy, carbamyl, carbo(lower alkoxy), lower alkylmercapto, lower alkylsulfoxy, lower alkylsulfonyl, sulfonamido and N,N-di(lower alkyl)sulfonamido. The favored positions on the fused benzene ring are the 6- and the 7-positions. Of special interest for these positions are at least one of the following substituents: hydrogen, methyl, chloro, fluoro and methoxy. A single substituent, that is, a 6- or a 7-substituent, is usually held in greater favor than is a 6,7-disubstituted derivative for reasons of economy as regards the reactants used. The preferred substituents, for reasons of economy and/or their favorable effect upon activity, are hydrogen, chloro and fluoro. Nitro, hydroxy and mercapto groups are not desirable substituents since they react with difficulty in the preferred process for making these novel compounds and/or result in formation of undesired products and poor yields.

Unique among the compounds of this invention by reason of their outstanding broad spectrum activity and/or significant growth promoting activity in swine are those compounds of formula I wherein Y is O, NH or N(lower alkyl); X is hydrogen or chloro, and A is ethylene or trimethylene.

It is noted that alkylene groups having more than five carbon atoms and which place from two to five carbon atoms in the heterocyclic ring between the two hetero atoms to which they are attached are also operative in this invention.

DETAILED SUMMARY OF THE INVENTION

The novel compounds of this invention of formulas I and II above are conveniently prepared by reaction, in the presence of a base, of the appropriate benzofuroxan with a methylene-activated reactant of formulas III and IV, respectively (Method A):

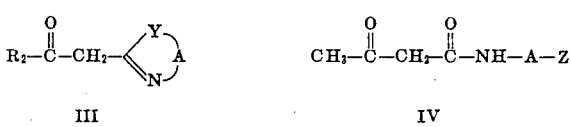

wherein A, Y and Z are as defined above.

The reaction is usually conducted in an appropriate solvent system, that is, a reaction-inert solvent or mixture of solvents, which serves to dissolve at least the reactants and which does not enter into adverse reactions with the reactants or products. Appropriate solvents are ethers such as diethylether, diisopropylether, dioxane, tetrahydrofuran, dimethylethers of ethylene glycol and diethyleneglycol; alcohols especially the lower molecular weight alcohols having up to four carbon atoms; N,N-dimethylformamide, organic amines, benzene, toluene, xylene, acetonitrile, halogenated hydrocarbons such as chloroform, methylene chloride, and mixtures of these solvents.

The reaction is normally conducted over the temperature range of from about 0° C. to about 100° C. and preferably from about 30° C. to about 100° C. Higher temperatures can be used but appear to offer no advantage and may in certain cases cause decomposition. The reaction period, as expected, depends not only upon the temperature, but also upon the reactants and particularly upon the base used. For a given set of reactants, the higher the reaction temperature, the shorter the reaction period; the lower the reaction temperature, the longer the reaction period. In general, the reaction is conducted in a solvent system at reflux temperature for a period of up to four hours followed by standing at room temperature for several hours, e.g., overnight.

A wide variety of bases are operative in the reaction of benzofuroxan-methylene-activated reactant process of this invention such as, for example, organic amines, ammonia, alkali metal hydroxides, alkali metal hydrides and alkali metal alkoxides. Representative of such bases are ammonia, primary amines such as methylamine, n-propylamine, n-butylamine, aniline, cyclohexylamine, benzylamine, p-toluidine, ethylamine, octylamine; secondary amines such as diethylamine, dipropylamine, methyl-n-butylamine, pyrrolidine, morpholine, piperidine, pyrrole, pyrroline, N-methylaniline, N-methylbenzylamine, pyrimidine; tertiary amines such as triethylamine, trimethylamine, N,N-dimethylaniline, N-methylpyrrolidine, 1,2-dimethyl-1,4,5,5-tetrahydropyrimidine, N-methylmorpholine and 1,5-diazabicyclo[4,3,0]-5-nonene; sodium hydroxide, potassium hydroxide, ammonium hydroxide, sodium ethoxide, potassium methoxide, sodium hydroxide and sodium hydride. The preferred bases are the alkali metal hydroxides and primary alkylamines since they tend to minimize the reaction period relative to that required by other bases and are productive of satisfactory yields of the desired product.

The base itself, if liquid at the reaction temperature, can also be used as solvent. This provision, as those skilled in the art will recognize, limits the use of bases as solvents to organic amines and ammonium hydroxide.

The amount of base required is not critical but can vary widely, e.g., from a trace or catalytic amount of base, that is, from about 0.001 percent by weight, based on the benzofuroxan reactant present, to even molar excess amounts as occurs when the base is used as solvent. In general, optimum amounts range from about 0.1 percent by weight to about equimolar amounts based on the benzofuroxan used. As will be readily appreciated, the optimum proportion of base will vary with the nature of the particular reactants employed, as well as specific reaction conditions. Accordingly, the optimum proportion of base is most conveniently established by routine experimentation using small scale laboratory reactions.

The molar ratio of reactants, that is, of the benzofuroxan and the methylene-activated reactant, is not critical but can vary widely, e.g., from equimolar proportions to a large excess of either reactant. They are, in general, reacted in equimolar proportions. As a practical measure when using a readily available methylene-activated reactant, e.g., 2-acetonylthiazoline, an excess of the reagent is used to ensure as complete a conversion of the benzofuroxan to the desired product as is possible. Further, the excess methylene-activated reactant can also serve as solvent.

The order of addition of reactants is not critical to the success of this process. They can be added all at once along with the base or the base can be added to a mixture of the benzofuroxan and methylene-activated reactant. This latter method is advantageous in the case of exothermic reactions since it facilitates temperature control apparently by regulating the rate of reaction. In the case of such exothermic reactions, the use of an appropriate solvent also contributes to temperature control. As alternatives to the above methods of addition of reactants, either reactant can be added to the other in the presence of the proper base, or the reactants can be added simultaneously to the base.

Compounds of formula II, produced by the reaction of a benzofuroxan with a compound of formula IV, serve as precursors for formula I compounds (Y=O and R₂=methyl) as those skilled in the art will recognize. The conversion of formula II compounds to those of formula I (wherein Y is O and R₂ is methyl) is, in fact, the preferred route to such compounds of formula I.

Utilization of compounds of formula IV in Method A, depending upon the reaction conditions employed, notably the amount of base, produces products of formula I (Y=O and R₂=methyl) or of formula II. The use of up to 0.25 mole of base per mole of benzofuroxan reactant produces compounds of formula II as the principal product. The use of larger amounts of base produces compounds of formula I (Y=O and R₂=methyl) as the major product.

Formula II compounds, N-(chloroalkyl)- and N-(bromoalkyl)-3-methyl-2-quinoxalinecarboxamide-1,4-dioxides, can by cyclized directly to compounds of formula I without isolation. Alternatively, they can be isolated by known methods as described herein. The bromo derivatives cyclize with greater ease than do the corresponding chloro derivatives. When isolation of the N-(bromoalkyl)-3-methyl-2-quinoxalinecarboxamide-1,4-dioxide is desired the minimal amount of base, not over 0.25 mole per mole of benzofuroxan reactant, is used. Additionally, the temperature is desirably held below about 40° C.

Cyclization of formula II compounds is readily accomplished by treating them with at least one molar proportion of a base such as those enumerated above. In actual practice an excess of base, preferably a molar excess is used to ensure as rapid and complete cyclization as possible. The cyclization is carried out at a temperature of about 0° C. to about 50° C. and preferably at a temperature of from about 20° C. to about 35° C. for periods of up to 24 hours. The reaction period, of course, depends upon the reaction temperature, lower temperatures requiring longer reaction periods than do higher temperatures. In general, reaction periods of from about four to about twenty hours are satisfactory.

Alternatively, the preparation of compounds of formula I wherein Y is O and R₂ is methyl is readily achieved by a simpler and more convenient process of broad applicability (Method B) described below.

Method B comprises reacting the appropriate benzofuroxan with an appropriate chloro or bromoalkylamine of formula V:

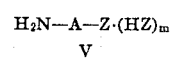

V wherein A and Z are as previously defined and m is 0 or 1; and diketene (ketene dimer). This is the preferred process since it utilizes readily available materials, is simple to carry out and productive of satisfactory yields of the desired product of formula I (Y=O, R₂=methyl) or of formula II depending upon the reaction conditions. The bromo- or chloroalkylamine can be used as such or as the corresponding hydrobromide or hydrochloride salt. The salts are, from a practical standpoint, frequently favored over the free base forms because of their better stability and ease of handling.

The reaction with the benzofuroxan reactant is most generally conducted in the presence of a base as catalyst. An excess of the bromo- or chloroalkylamine reactant, free base form, can, of course, be used as the base. However, other bases, such as those enumerated above in Method A are more efficient and more economical to use.

Here also, as in Method A and as noted above, the amount of base used determines whether the product is of formula I or formula II. The reaction is usually conducted in a suitable solvent system at a temperature of from about 0° C. to about 100° C. as is described for Method A.

The order of addition of reactants is not critical to the success of this process. The reaction can be conducted by simultaneous or stepwise addition of the various reactants including the excess amine or separate base as catalyst.

From a practical standpoint in order to achieve maximum yield of the desired quinoxaline-1,4-dioxide compound of formulas I or II, it is advantageous to react the diketene and amine containing reactant together in an appropriate solvent system for a brief period before adding the benzofuroxan. A preferred method comprises adding a solution of the desired amine in a reaction-inert solvent to at least an equimolar solution of diketene in the same or other reaction-inert solvent which is miscible with the amine solvent at a temperature of from about 0° C. to about 30° C. The mixture is then treated immediately with the catalyst and benzofuroxan reactant by dissolving this last reactant into the amine-diketene reaction mixture. The temperature of this phase of the reaction is not critical but can range up to about 100° C. In most instances, the temperature of this phase is kept below about 60° C. and is frequently run at room temperature for periods of up to 24 hours. In most instances, the reaction mixture is allowed to stand at room temperature for several hours, e.g., overnight.

Still a further procedure (Method C) comprises reacting the appropriate benzofuroxan with a preformed enamine of the ketone reactant of formula III or IV. A detailed review of the preparation and reactions of enamines is presented by Szmuszkovicz, "Advances in Organic Chemistry," Volume 4, pages 1–113, Interscience Publishers, New York (1963). Enamines are most conveniently prepared by the reaction of a ketone with a secondary amine, such as morpholine, pyrrolidine, piperidine, N-methyl-N-cyclohexylamine, or di(lower alkyl)amines such as dimethylamine, diethylamine and di(n-butyl)-amines as is reported by Szmuszkovicz. Ammonia and primary amines can, of course, also be used. However, enamine formation via secondary amines is preferred because of the ease of preparation of such enamines.

The reaction comprises adding the enamine to a solution of the appropriate benzofuroxan in a suitable reaction-inert solvent such as those cited above at a temperature of from about 0° C. to about 100° C. and preferably at a temperature of from about 20° C. to about 80° C. The products are recovered by evaporation of the solvent and are purified by recrystallization from a suitable solvent.

Compounds of formula I wherein Y is $NR_1$ or S are also prepared by the reaction of an X-substituted-2-cyano-3-$R_2$-substitutedquinoxaline-1,4-dioxide with the appropriate alkylenediamine tosylate ($H_2N$-A-$NHR_1$-$C_7H_7SO_3H$) or thioalkylamine ($H_2N$-A-SH), respectively, according to known procedures. Alternatively, the X-substituted-2-cyano-3-$R_2$-substitutedquinoxaline-1,4-dioxide is converted to an imido ether hydrochloride which is then reacted with the appropriate alkylenediamine or thioalkylamine to provide the corresponding cyclic compound of formula I. As those skilled in the art will recognize, the above-mentioned reactions for preparing compounds of formula I wherein Y is $NR_1$ lead to formation of the tosylate (p-toluenesulfonate) and hydrochloride salts of the cyclized product.

This method, as well as Methods A and B above, produce both the 6- and 7-isomers of those compounds wherein X is other than hydrogen because of the existence of a dynamic, tautomeric equilibrium in the starting X-substituted benzofuroxan. The isomers, actually a mixture of isomers, are recovered by methods known to those skilled in the art. In many of the preparations disclosed herein a solid, often crystalline material, separates from the reaction mixture. The solid appears to consist predominantly of one of the isomers, which isomer can be purified by repeated recrystallization from a suitable solvent to a constant melting point. The other isomer, the one present in smaller amounts in the solid material, is the predominant product in the mother liquor. It can be recovered by methods known to those skilled in the art, as, for example, by evaporation of the mother liquor and repeated crystallization of the residue to a product of constant melting point. Alternatively, the reaction mixture can be extracted with a suitable solvent, either before or after evaporation to dryness, and the extracted material which contains both isomers purified further by recrystallization.

The identification of the isomers has not been completed. Both isomers of a given compound, however, exhibit the same type of activity, e.g., as animal growth promotants or as antibacterial agents, to a significant degree.

Acid addition salts of compounds of formula I wherein Y is -$NR_1$ are prepared by methods well-known to those skilled in the art. A convenient method comprises dissolving the free base in a suitable solvent, e.g., acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner, the sulfate, hydrochloride, hydrobromide, nitrate, phosphate, acetate, propionate, butyrate, citrate, gluconate, benzoate, pamoate, amsonate, the tartrate, 3-hydroxy-2-naphthoate and the sulfosalicylate and other salts can be prepared.

The requisite 2-(oxoalkyl)-substituted heterocyclic compounds (formula III) are prepared from the corresponding 2-methyl substituted heterocyclic compounds. The process comprises reacting the lithio salt of the appropriate 2-methyl substituted heterocyclic compound with a lower alkyl ester of the appropriate alkanoic acid; e.g., methyl or ethyl ester of acetic, propionic, butyric or isobutyric acid, with an acid halide of said alkanoic acid; e.g., acetyl, propionyl, butyryl or valeryl chloride (or bromide), or with a simple anhydride of said alkanoic acid; e.g., acetic, propionic or butyric anhydride.

The lithio salts of the 2-methyl substituted heterocyclic compounds are prepared by treating the appropriate 2-methyl heterocyclic compound with phenyl-, n-butyl-, or t-butyllithium in tetrahydrofuran at temperatures of from about −50° C. to about −80° C. as is described by Meyers et al. in J. Am. Chem. Soc. 91, 763-4 (1969). Addition of a lower alkyl ester or a simple anhydride or acid chloride to the tetrahydrofuran solution of the lithio salt at about −50° C. to about −80° C. affords the acylated derivative: a 2-(oxoalkyl)substituted heterocyclic compound (formula III).

The precursor 2-methyl substituted heterocyclic compounds of formula VI

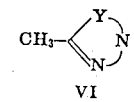

VI wherein Y and A are as defined above and are prepared by known methods. Compounds wherein Y is -$NR_1$ are prepared by methods described in Elderfield, "Heterocyclic Compounds," J. Wiley & Sons, Inc., New York (1957), Volume 5, pages 239-240; and Volume 6, page 248. Compounds wherein Y is O are prepared by procedures in Elderfield, Ibid, Volume 5, page 377 and Volume 6, page 534; and those wherein Y is S are described in Elderfield, Ibid, Volume 5, page 679 and Volume 6, page 604. Typical procedures are exemplified herein.

The valuable products of this invention are remarkably effective in treating a wide variety of pathogenic micro-organisms. They are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a non-toxic carrier such as vegetable or mineral oil or an emollient cream. Similarly, they may be dissolved or dispersed in liquid carriers or solvents such as water, alcohol, glycols or mixtures thereof or other non-toxic inert media, that is, media which have no harmful effect on the active ingredient. For such purposes, it will generally be acceptable to employ concentrations of active ingredients of from about 0.01 percent to about 10 percent by weight based on total composition.

Further, many of the compounds described herein exhibit broad spectrum activity, that is, activity against both gram-negative and gram-positive bacteria, such as *Escherichia coli*, *Shigella sonnei*, *Staphylococcus aureus*, *Streptococcus pyogenes* and *Pasteurella multocida*. This is in contrast to the usual gram-negative activity of quinoxaline-di-N-oxides. Additionally, many of them are active in vivo and are especially useful as animal growth promotants, especially for swine and poultry.

When used in vivo for such purposes, these novel compounds can be administered orally or parenterally, e.g., by subcutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or nonaqueous such as fatty oils of vegetable origin (cotton seed, peanut oil, corn, sesame), dimethylsulfoxide, and other nonaqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically acceptable inert carriers including solid diluents, aqueous vehicles, non-toxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

Other methods include mixing with animal feeds, the preparation of feed concentrates and supplements and dilute solutions or suspensions, e.g., a 0.1 percent solution, for drinking purposes. The addition of a low level of one or more of the herein described quinoxaline-di-N-oxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers, including the following: soybean oil meal, corn gluten meal, cotton seed oil meal, sunflower seed meal, linseed oil meal, cornmeal, limestone and corncob mean can be employed. The carrier facilitates uniform distribution of the active materials in the finished feed with which the concentrate is blended. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meal(1:1). Other dietary supplements, such as vitamins, minerals, etc. may be added to the concentrates in the appropriate circumstances.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well-known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are given solely for the purpose of illustration.

EXAMPLE I 2-(2-Oxazolin-2-yl)-3-Methylquinoxaline-1,4-Dioxide

A solution of 2-bromoethylamine hydrobromide (21.0 g.) in water (30 ml.) is added to a solution of diketene (8.4 g.) in chloroform (150 ml.) at 0° C. and the mixture stirred rigorously. A solution of sodium hydroxide (4.1 g. in 20 ml. water) is then added to the stirred mixture over a period of 20 minutes at 0° C. The reaction mixture is then stirred at room temperature for one hour, the chloroform phase separated, dried with anhydrous sodium sulfate and evaporated to dryness to give a white solid: N-(2-bromoethyl)acetoacetamide.

The N-(2-bromoethyl)acetoacetamide (20.8 g.) and benzofuroxan (13.6 g.) are dissolved in ethanol (150 ml.) and ethylamine (16 ml.) slowly added to the solution while maintaining the temperature below 30° C. The reaction mixture is held at room temperature overnight then filtered to give 6.4 g.

(26.1 percent yield) of the desired product; M.P. 211° C. Recrystallization from methanol-chloroform (1-1) raises the melting point to 217°–218° C. Analysis: Calc'd for $C_{12}H_{11}N_3O_3$: %C, 58.77; %H, 4.52; %N, 17.14  Found: %C, 58.23; %H, 4.52; %N, 17.02.

EXAMPLE II

N-(2-Chloroethyl)-3-Methyl-2-Quinoxalinecarboxamide-1,4-Dioxide

N-(2-chloroethyl)acetoacetamide (0.5 mole) is prepared by reacting 2-chloroethylamine hydrochloride (0.5 mole), diketene (0.5 mole) and sodium hydroxide (0.5 mole) in water (150 ml.)-chloroform (750 ml.) according to the procedure of Example I for making the corresponding bromo derivative.

The N-(2-chloroethyl)acetoacetamide (0.5 mole) thus produced is dissolved in ethanol (800 ml.) and benzofuroxan (68 g., 0.5 mole) added. When solution is complete, n-propylamine (15 g., 0.18 mole) is slowly added to the solution while holding the temperature below 30° C. The reaction mixture is allowed to stand overnight at room temperature then filtered to give 19.1 g. of product. A second crop 23.8 g. is obtained by allowing the mixture to stand. Total yield: 42.9 g., 30.5 percent; M.P. 175°–176° C. An analytical sample is obtained by recrystallizing the product from methanol; M.P. 176°–177° C.

Analysis: Calc'd for $C_{12}H_{12}N_3O_3Cl$: %C, 51.16; %H, 4.30; %N, 14.92; %Cl, 12.58
Found: %C, 50.88; %H, 4.29; %N, 14.95; %Cl, 12.45.

EXAMPLE III

2-(2-Oxazolin-2-yl)-3-Methylquinoxaline-1,4-Dioxide

A suspension of N-(2-chloroethyl)-3-methyl-2-quinoxalinecarboxamide-1,4-dioxide (36.0 g.) and 500 ml. of a 40 percent aqueous monomethylamine solution is stirred for twenty hours at room temperature. The N-(2-chloroethyl)-3-methyl-2-quinoxalinecarboxamide-1,4-dioxide reactant dissolves slowly and the cyclized product crystallizes from the mixture. The reaction mixture is filtered, washed with water, then with acetone, and dried to give 26.7 g. of product; M.P. 217°–218° C. (83 percent yield).

EXAMPLE IV

2-(5,6-Dihydro-4H-1,3-oxazin-2-yl)-3-Methyl Quinoxaline-1,4Dioxide

To a solution of diketene (4.2 g.) in chloroform (75 ml.) is added 3-bromopropylamine hydrobromide (10.4 g.) in water (20 ml.) at 0° C. and the mixture thoroughly stirred. A solution of sodium hydroxide (2.0 g. in 10 ml. water) is then added over a 20 hour period at 0° C. and the mixture stirred for an additional hour at room temperature. The chloroform phase is separated, dried with anhydrous sodium sulfate and evaporated to give N-(3-bromopropyl)acetoacetamide as a white solid.

The N-(3-bromopropyl)acetoacetamide is then added to a solution of benzofuroxan (6.8 g.) in ethanol (75 ml.) and an excess of ammonia gas passed into the solution (until the solution is saturated) while holding the temperature below 30° C. The reaction mixture is allowed to stand overnight at room temperature then filtered to give the product: 2.0 g. (15.4 percent); M.P. 218° C. when recrystallized from methanol.

EXAMPLE V

Following the procedure of Example I, the 2-heterocyclic substituted quinoxaline-1,4-dioxides listed below are prepared from the appropriate benzofuroxan and ω-bromo-(or chloro)alkylamine hydrobromide reactants. The 6- and 7-isomers are produced in each instance.

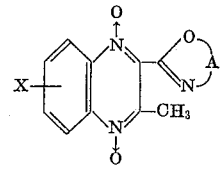

| X | A* | X | A* |
|---|---|---|---|
| Cl | —(CH₂)₂— | CF₃ | —(CH₂)₄— |
| Br | —(CH₂)₂— | H | —(CH₂)₅— |
| F | —(CH₂)₂— | Cl | —(CH₂)₅— |
| CH₃ | —(CH₂)₂— | Br | —(CH₂)₅— |
| OCH₃ | —(CH₂)₂— | F | —(CH₂)₅— |
| CF₃ | —(CH₂)₂— | CH₃ | —(CH₂)₅— |
| Cl | —(CH₂)₃— | OCH₃ | —(CH₂)₅— |
| Br | —(CH₂)₃— | CF₃ | —(CH₂)₅— |
| F | —(CH₂)₃— | H | —CH(CH₃)CH₂— |
| CH₃ | —(CH₂)₃— | Cl | —CH(CH₃)CH₂— |
| OCH₃ | —(CH₂)₃— | Br | —CH(CH₃)CH₂— |
| CF₃ | —(CH₂)₃— | F | —CH(CH₃)CH₂— |
| H | —(CH₂)₃— | CH₃ | —CH(CH₃)CH₂— |
| Cl | —(CH₂)₃— | OCH₃ | —CH(CH₃)CH₂— |
| Br | —(CH₂)₃— | CF₃ | —CH(CH₃)CH₂— |
| F | —(CH₂)₃— | H | —CH₂CH(CH₃)— |
| CH₃ | —(CH₂)₃— | Cl | —CH₂CH(CH₃)— |
| OCH₃ | —(CH₂)₄— | Br | —CH₂CH(CH₃)— |
| F | —CH(CH₃)CH₂CH₂— | H | —CH₂CH(C₂H₅)— |
| OCH₃ | —CH(CH₃)CH₂CH₂— | Cl | —CH₂CH(C₂H₅)— |
| H | —CH(CH₃)CH(CH₃)— | Br | —CH₂CH(C₂H₅)— |
| Cl | —CH(CH₃)CH(CH₃)— | OCH₃ | —CH₂CH(C₂H₅)— |
| F | —CH(CH₃)CH(CH₃)— | CF₃ | —CH₂CH(C₂H₅)— |
| CH₃ | —CH(CH₃)CH(CH₃)— | H | —CH(CH₃)CH₂CH(CH₃)— |
| OCH₃ | —CH(CH₃)CH(CH₃)— | Cl | —CH(CH₃)CH₂CH(CH₃)— |
| CF₃ | —CH(CH₃)CH(CH₃)— | F | —CH(CH₃)CH₂CH(CH₃)— |
| H | —CH(CH₃)CH(C₂H₅)— | OCH₃ | —CH(CH₃)CH₂CH(CH₃)— |
| Cl | —CH(CH₃)CH(C₂H₅)— | H | —CH₂CH₂C(CH₃)₂— |
| F | —CH(CH₃)CH(C₂H₅)— | Cl | —CH₂CH₂C(CH₃)₂— |
| OCH₃ | —CH(CH₃)CH(C₂H₅)— | OCH₃ | —CH₂CH₂C(CH₃)₂— |
| CH₃ | —CH(CH₃)CH(C₂H₅)— | F | —CH₂CH(CH₃)— |
| H | —CH₂CH₂CH₂CH(CH₃)— | CH₃ | —CH₂CH(CH₃)— |
| Cl | —CH₂CH₂CH₂CH(CH₃)— | OCH₃ | —CH₂CH(CH₃)— |
| F | —CH₂CH₂CH₂CH(CH₃)— | CF₃ | —CH₂CH(CH₃)— |
| CH₃ | —CH₂CH₂CH₂CH(CH₃)— | H | —CH₂C(CH₃)₂— |
| CF₃ | —CH₂CH₂CH₂CH(CH₃)— | Cl | —CH₂C(CH₃)₂— |
| H | —CH(CH₃)C(CH₃)₂— | Br | —CH₂C(CH₃)₂— |
| Cl | —CH(CH₃)C(CH₃)₂— | F | —CH₂C(CH₃)₂— |
| Br | —CH(CH₃)C(CH₃)₂— | CH₃ | —CH₂C(CH₃)₂— |
| F | —CH(CH₃)C(CH₃)₂— | CF₃ | —CH₂C(CH₃)₂— |

Continued

| X | A* | X | A* |
|---|---|---|---|
| CF₃ | —CH(CH₃)C(CH₃)₂— | H | —CH₂CH(i-C₃H₇)— |
| H | —CH(CH₃)CH₂CH₂CH₂— | Cl | —CH₂CH(i-C₃H₇)— |
| Cl | —CH(CH₃)CH₂CH₂CH₂— | Br | —CH₂CH(i-C₃H₇)— |
| F | —CH(CH₃)CH₂CH₂CH₂— | F | —CH₂CH(i-C₃H₇)— |
| CH₃ | —CH(CH₃)CH₂CH₂CH₂— | CH₃ | —CH₂CH(i-C₃H₇)— |
| OCH₃ | —CH(CH₃)CH₂CH₂CH₂— | OCH₃ | —CH₂CH(i-C₃H₇)— |
| H | —C(CH₃)₂CH₂CH₂— | H | —CH(CH₃)CH₂CH₂— |
| Cl | —C(CH₃)₂CH₂CH₂— | Cl | —CH(CH₃)CH₂CH₂— |
| CH₃ | —C(CH₃)₂CH₂CH₂— | CF₃ | —CH(CH₃)CH₂CH₂— |
| OCH₃ | —C(CH₃)₂CH₂CH₂— | | |

*In this and subsequent tables, the A group listed is written in such a manner that the left bond of the group is attached to the =N atom of the heterocyclic ring and the right bond of the group to the other hetero atom, in this example, to 0.

EXAMPLE VI 2-(2-Imidazolin-2-yl)-3-Methylquinoxaline-1,4-Dioxide

A. 2-Acetonylimidazoline (6.3 g., 0.05 mole) and benzofuroxan (8.3 g., 0.05 mole) are added to a 0.5 molar solution of sodium methoxide in methanol (100 ml.) and the mixture refluxed for three hours. The solvent is reduced under reduced pressure and the residue crystallized from methanol-chloroform (1:1).

B. The enamine of 2-acetonylimidazoline and pyrrolidine (0.05 mole), prepared according to the procedure of Example X–C, and benzofuroxan (0.05 mole) in methanol (100 ml.) at 30° C. are stirred for one hour. The solution is then taken to dryness under reduced pressure and the residue recrystallized from methanol-chloroform (1:1).

EXAMPLE VII 2-(2-Imidazolin-2-yl)-3-Methylquinoxaline-1,4-Dioxide Tosylate

A mixture of 2-cyano-3-methylquinoxaline-1,4-dioxide (10 g., 0.05 mole), ethylenediamine (3.3 g., 0.055 mole) and p-toluenesulfonic acid monohydrate (9.5 g., 0.05 mole) is heated at 160° to 180° C. for eight hours during which time the evolution of ammonia is noted. The mixture is then cooled and recrystallized from methanol-chloroform.

The tosylate salt is converted to the base by treating the salt in water with aqueous sodium hydroxide (10 percent excess) and extracting the cyclic amidine with ethyl acetate. The ethyl acetate extracts are dried ($Na_2SO_4$) and the solvent evaporated to give the free base form of the title compound.

EXAMPLE VIII

2-[2-(1,4,5,6-Tetrahydropyrimidin-2-yl)]-3-Methyl-Quinoxaline-1,4-Dioxide Hydrochloride Ethyl(3-methyl-quinoxaline-2-formimidate)-1,4-dioxide hydrochloride (14.7 g., 0.05 mole) is added to a solution of trimethylenediamine (3.7 g., 0.05 mole) in ethanol (200 ml.) at 0° C., the mixture thoroughly stirred, then heated to reflux overnight. Evaporation of the mixture (under reduced pressure) to dryness gives the desired product.

Treatment of the product with a slight excess of 40 percent aqueous sodium hydroxide at 5° C. affords the free base which is extracted with ether. The ether solution is dried and evaporated to dryness to recover the free base form of the title compound.

EXAMPLE IX

Following the procedures of Examples VI, VII and VIII, the cyclic amidine derivatives listed below are prepared from the appropriate benzofuroxan and 2-acetonyl substituted cyclic amidines (Example VI-A) or the preformed enamine of the 2-acetonyl substituted cyclic amidine (Example VI-B); or from the appropriate alkylenediamine and X-substituted-2-cyano-3-methyl-quinoxaline-1,4-dioxide (Example VII), or the ethylimido-ether hydrochloride of the X-substituted-2-cyano-3-methylquinoxaline-1,4-dioxide (Example VIII).

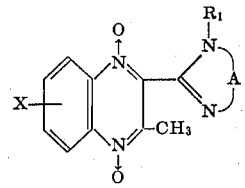

| X | A | R₁ | Method Example |
|---|---|---|---|
| Cl | —(CH₂)₂— | H | VI-A |
| Br | —(CH₂)₂— | H | VI-A |
| F | —(CH₂)₂— | H | VI-A |
| CH₃ | —(CH₂)₂— | H | VI-A |
| OCH₃ | —(CH₂)₂— | H | VI-A |
| CF₃ | —(CH₂)₂— | H | VI-A |
| H | —(CH₂)₂— | CH₃ | VI-A |
| Cl | —(CH₂)₂— | CH₃ | VI-A |
| Br | —(CH₂)₂— | CH₃ | VI-A |
| F | —(CH₂)₂— | CH₃ | VI-A |
| CH₃ | —(CH₂)₂— | CH₃ | VI-A |
| OCH₃ | —(CH₂)₂— | CH₃ | VI-A |
| CF₃ | —(CH₂)₂— | CH₃ | VI-A |
| H | —(CH₂)₂— | C₂H₅ | VI-B |
| Cl | —(CH₂)₂— | C₂H₅ | VI-B |
| F | —(CH₂)₂— | C₂H₅ | VI-A |
| CH₃ | —(CH₂)₂— | C₂H₅ | VI-A |
| OCH₃ | —(CH₂)₂— | C₂H₅ | VI-A |
| H | —(CH₂)₂— | n-C₃H₇ | VI-B |
| Br | —(CH₂)₂— | n-C₃H₇ | VI-B |
| CH₃ | —(CH₂)₂— | n-C₃H₇ | VI-A |
| H | —(CH₂)₂— | i-C₃H₇ | VI-A |
| Cl | —(CH₂)₂— | i-C₃H₇ | VI-A |
| OCH₃ | —(CH₂)₂— | i-C₃H₇ | VI-A |
| H | —(CH₂)₂— | n-C₄H₉ | VI-A |
| Cl | —(CH₂)₂— | n-C₄H₉ | VI-A |
| F | —(CH₂)₂— | n-C₄H₉ | VI-A |
| CF₃ | —(CH₂)₂— | n-C₄H₉ | VI-A |
| H | —(CH₂)₃— | H | VI-B |
| Cl | —(CH₂)₃— | H | VI-B |
| CH₃ | —(CH₂)₃— | H | VII |
| OCH₃ | —(CH₂)₃— | H | VII |
| CF₃ | —(CH₂)₃— | H | VII |
| H | —(CH₂)₃— | CH₃ | VI-A |
| Cl | —(CH₂)₃— | CH₃ | VI-A |
| Br | —(CH₂)₃— | CH₃ | VI-A |
| F | —(CH₂)₃— | CH₃ | VI-A |
| OCH₃ | —(CH₂)₃— | CH₃ | VI-A |
| H | —(CH₂)₃— | n-C₃H₇ | VII |
| Cl | —(CH₂)₃— | n-C₃H₇ | VII |
| OCH₃ | —(CH₂)₃— | n-C₃H₇ | VII |
| CF₃ | —(CH₂)₃— | n-C₃H₇ | VII |
| H | —(CH₂)₃— | i-C₄H₉ | VII |
| Cl | —(CH₂)₃— | i-C₄H₉ | VII |
| H | —(CH₂)₄— | H | VI-A |
| Cl | —(CH₂)₄— | H | VI-A |
| F | —(CH₂)₄— | H | VI-A |
| CH₃ | —(CH₂)₄— | H | VI-A |
| OCH₃ | —(CH₂)₄— | H | VI-A |
| H | —(CH₂)₄— | CH₃ | VI-A |
| Cl | —(CH₂)₄— | CH₃ | VI-A |
| Br | —(CH₂)₄— | CH₃ | VI-A |
| CF₃ | —(CH₂)₄— | CH₃ | VI-A |
| H | —(CH₂)₄— | n-C₃H₇ | VII |
| Cl | —(CH₂)₄— | n-C₃H₇ | VII |
| OCH₃ | —(CH₂)₄— | n-C₃H₇ | VII |
| H | —(CH₂)₅— | H | VII |
| Cl | —(CH₂)₅— | H | VII |
| F | —(CH₂)₅— | H | VII |
| CH₃ | —(CH₂)₅— | H | VII |
| OCH₃ | —(CH₂)₅— | H | VII |
| H | —(CH₂)₅— | C₂H₅ | VII |
| Cl | —(CH₂)₅— | C₂H₅ | VII |
| CH₃ | —(CH₂)₅— | C₂H₅ | VII |
| OCH₃ | —(CH₂)₅— | C₂H₅ | VII |
| F | —(CH₂)₅— | C₂H₅ | VII |
| H | —CH₂C(CH₃)₂— | H | VII |
| Cl | —CH₂C(CH₃)₂— | H | VII |
| F | —CH₂C(CH₃)₂— | H | VII |
| CH₃ | —CH₂C(CH₃)₂— | H | VII |
| OCH₃ | —CH₂C(CH₃)₂— | H | VII |
| H | —CH₂C(CH₃)₂— | i-C₃H₇ | VI-A |
| Cl | —CH₂C(CH₃)₂— | i-C₃H₇ | VI-A |
| CF₃ | —CH₂C(CH₃)₂— | i-C₃H₇ | VI-A |
| OCH₃ | —CH₂C(CH₃)₂— | i-C₃H₇ | VI-A |
| Br | —CH₂C(CH₃)₂— | i-C₃H₇ | VI-A |

Continued

| X | A | $R_1$ | Method Example |
|---|---|---|---|
| H | $-CH_2C(CH_3)_2-$ | $n-C_4H_9$ | VI-A |
| Cl | $-CH_2C(CH_3)_2-$ | $n-C_4H_9$ | VI-A |
| H | $-CH_2C(CH_3)_2-$ | $sec-C_4H_9$ | VI-A |
| F | $-CH_2C(CH_3)_2-$ | $sec-C_4H_9$ | VI-A |
| H | $-CH_2C(CH_3)_2-$ | $CH_3$ | VI-A |
| Cl | $-CH_2C(CH_3)_2-$ | $CH_3$ | VI-A |
| H | $-CH_2C(C_2H_5)_2-$ | $CH_3$ | VI-A |
| Cl | $-CH_2C(C_2H_5)_2-$ | $CH_3$ | VI-A |
| $CH_3$ | $-CH_2C(C_2H_5)_2-$ | $CH_3$ | VI-A |
| H | $-CH_2CH(C_2H_5)-$ | H | VII |
| Cl | $-CH_2CH(C_2H_5)-$ | H | VII |
| $OCH_3$ | $-CH_2CH(C_2H_5)-$ | H | VII |
| $CF_3$ | $-CH_2CH(C_2H_5)-$ | H | VII |
| H | $-CH_2CH(C_2H_5)-$ | $CH_3$ | VII |
| F | $-CH_2CH(C_2H_5)-$ | $CH_3$ | VII |
| $OCH_3$ | $-CH_2CH(C_2H_5)-$ | $CH_3$ | VII |
| H | $-CH_2CH(C_2H_5)-$ | $n-C_3H_7$ | VII |
| Cl | $-CH_2CH(C_2H_5)-$ | $n-C_3H_7$ | VII |
| H | $-CH(CH_3)CH(CH_3)-$ | H | VIII |
| Cl | $-CH(CH_3)CH(CH_3)-$ | H | VIII |
| Br | $-CH(CH_3)CH(CH_3)-$ | H | VIII |
| $CH_3$ | $-CH(CH_3)CH(CH_3)-$ | H | VIII |
| $OCH_3$ | $-CH(CH_3)CH(CH_3)-$ | H | VIII |
| H | $-CH_2CH(CH_3)CH_2CH_2-$ | H | VII |
| Cl | $-CH_2CH(CH_3)CH_2CH_2-$ | H | VII |
| $OCH_3$ | $-CH_2CH(CH_3)CH_2CH_2-$ | H | VII |
| F | $-CH_2CH(CH_3)CH_2CH_2-$ | H | VII |
| $CF_3$ | $-CH_2CH(CH_3)CH_2CH_2-$ | H | VII |
| H | $-CH(CH_3)CH_2-$ | H | VII |
| Cl | $-CH(CH_3)CH_2-$ | H | VII |
| $OCH_3$ | $-CH(CH_3)CH_2-$ | H | VII |
| $CF_3$ | $-CH(CH_3)CH_2-$ | H | VII |
| H | $-C(CH_3)_2CH_2-$ | H | VIII |
| Cl | $-C(CH_3)_2CH_2-$ | H | VII |
| F | $-C(CH_3)_2CH_2-$ | H | VII |
| H | $-CH_2C(CH_3)(C_2H_5)$ | H | VII |
| F | $-CH_2C(CH_3)(C_2H_5)$ | H | VII |
| $OCH_3$ | $-CH_2C(CH_3)(C_2H_5)$ | H | VII |
| H | $-CH_2C(CH_3)_2CH_2-$ | H | VII |
| Cl | $-CH_2C(CH_3)_2CH_2-$ | H | VII |
| $CH_3$ | $-CH_2C(CH_3)_2CH_2-$ | H | VII |
| H | $-CH_2C(CH_3)_2CH_2-$ | $CH_3$ | VI-A |
| Cl | $-CH_2C(CH_3)_2CH_2-$ | $CH_3$ | VI-A |
| H | $-CH_2C(CH_3)_2CH_2-$ | $n-C_3H_7$ | VI-A |
| H | $-CH_2CH_2CH(CH_3)-$ | $CH_3$ | VI-A |
| Cl | $-CH_2CH_2CH(CH_3)-$ | $CH_3$ | VI-A |
| F | $-CH_2CH_2CH(CH_3)-$ | $CH_3$ | VI-A |
| $OCH_3$ | $-CH_2CH_2CH(CH_3)-$ | $CH_3$ | VI-A |

Repetition of the above procedures but substituting the above-named reactants; i.e., 2-acetonyl substituted cyclic amidine or preformed enamine thereof, or X-substituted-2-cyano-3-methylquinoxaline-1,4-dioxide and ethylimido-ethers thereof; by the 2-(oxalkyl) cyclic amidines of Preparation F (compounds of formula III wherein Y is $-NR_1$, as defined herein) or preformed enamine thereof, or by an X-substituted-2-cyano-3-loweralkylquinoxaline-1,4-dioxide (Preparation G) or ethylimido-ether thereof (Preparation E), respectively, produces the corresponding products wherein the 2-methyl group is replaced by a 3-lower alkyl group.

EXAMPLE X 2-(2Thiazolin-2-yl)-3-Methylquinoxaline-1,4-Dioxide

A. Benzofuroxan (8.3 g., 0.05 mole) and 2-acetonylthiazoline (7.2 g., 0.05 mole) are added to a 0.5 molar solution of sodium methoxide in methanol (100 ml.) and the mixture refluxed for 3 hours. The solvent is then removed by distillation in vacuo and the residue crystallized from methanolchloroform (1:1).

B. Repetition of the above procedure but using morpholine (4.3 g.) and benzene (300 ml.) in place of sodium methoxide and methanol produces the same product.

C. Use of Preformed Enamine. A mixture of thiophene-free benzene (300 ml.). pyrrolidine (4 mole equivalents) and 2-acetonylthiazoline (0.05 mole) is heated at reflux until one mole equivalent of water is collected in a Bidwell-Sterling moisture trap placed between the reaction flask and the condenser. The mixture is then evaporated to dryness in vacuo, care being taken to exclude moisture. The residue is triturated with methanol, cooled and filtered.

The enamine is then added to a solution of benzofuroxan (0.05 mole) in methanol (100 ml.) at 30° C., the mixture stirred for one hour then taken to dryness in vacuo. The product is recrystallized from methanol-chloroform. It is identical to the product of method A above.

EXAMPLE XI

The following compounds are prepared by the above methods but using the appropriate substituted benzofuroxan in place of benzofuroxan.

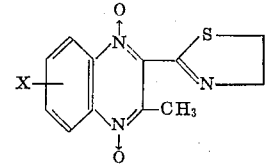

| X* | Method |
|---|---|
| Cl | A, C |
| Br | B |
| F | A, B |
| $CH_3$ | B, C |
| $OCH_3$ | B, C |
| $CF_3$ | A |

*The 6- and the 7-isomers are produced in each instance.

EXAMPLE XII

2-[2-(5,6-Dihydro-4H-1,3-Thiazin-2-yl)]-3-Methylquinoxaline-1,4-Dioxide

A mixture of 2-cyano-3-methylquinoxaline-1,4-dioxide (10 g., 0.05 mole), 3-mercaptopropylamine hydrochloride (8.76 g., 0.053 mole) and absolute ethanol (50 ml.) is heated under reflux until ammonia is no longer evolved. The mixture is cooled to room temperature, poured into cold water (250 ml.) and made basic with potassium hydroxide (6N). The oil which separates is extracted with ether, the ether extract dried over anhydrous sodium sulfate and evaporated to dryness to give the product.

EXAMPLE XIII 2-(2-Thiazolin-2-yl)-3-Methylquinoxaline-1,4-Dioxide

To a solution of 2-mercaptoethylamine (2.27 g., 0.02 mole) in ethanol (100 ml.) at 0° C. is added ethyl (3-methylquinoxaline-2-formimidate)-1,4-dioxide (4.9 g., 0.02 mole). The mixture is stirred, heated to reflux overnight then evaporated to dryness under reduced pressure to give the product.

EXAMPLE XIV

The procedure of Example VI-A is repeated but using the appropriate 2-acetonyl substituted heterocyclic compound and the appropriate benzofuroxan reactant to produce compounds having the formula:

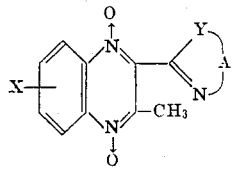

| X | Y | A | X | Y | A |
|---|---|---|---|---|---|
| H | O | $-(CH_2)_2-$ | H | S | $-(CH_2)_3-$ |

Continued

| X | Y | A | X | Y | A |
|---|---|---|---|---|---|
| Cl | O | —(CH₂)₂— | Cl | S | —(CH₂)₅— |
| H | O | —(CH₂)₃— | OCH₃ | S | —(CH₂)₅— |
| F | O | —(CH₂)₃— | CF₃ | S | —(CH₂)₅— |
| H | O | —(CH₂)₄— | F | S | —(CH₂)₅— |
| H | O | —CH(CH₃)CH₂— | H | S | —CH(CH₃)CH₂— |
| Cl | O | —CH₂C(CH₃)₂CH₂— | Cl | S | —CH(CH₃)CH₂— |
| H | S | —(CH₂)₃— | Br | S | —CH(CH₃)CH₂— |
| Cl | S | —(CH₂)₃— | CH₃ | S | —CH(CH₃)CH₂— |
| F | S | —(CH₂)₃— | CF₃ | S | —CH(CH₃)CH₂— |
| CH₃ | S | —(CH₂)₃— | H | S | —CH₂CH(C₂H₅)— |
| OCH₃ | S | —(CH₂)₃— | Cl | S | —CH₂CH(C₂H₅)— |
| CF₃ | S | —(CH₂)₃— | F | S | —CH₂CH(C₂H₅)— |
| H | S | —(CH₂)₄— | CH₃ | S | —CH₂CH(C₂H₅)— |
| Cl | S | —(CH₂)₄— | OCH₃ | S | —CH₂CH(C₂H₅)— |
| F | S | —(CH₂)₄— | H | S | —CH₂CH₂CH(CH₃)— |
| OCH₃ | S | —(CH₂)₄— | Cl | S | —CH₂CH₂CH(CH₃)— |
| H | S | —CH(CH₃)CH₂CH₂— | H | S | —C(CH₃)₂CH₂CH₂— |
| Cl | S | —CH(CH₃)CH₂CH₂— | Cl | S | —C(CH₃)₂CH₂CH₂— |
| OCH₃ | S | —CH(CH₃)CH₂CH₂— | CH₃ | S | —C(CH₃)₂CH₂CH₂— |
| H | S | —CH(CH₃)CH(CH₃)— | F | S | —C(CH₃)₂CH₂CH₂— |
| F | S | —CH(CH₃)CH(CH₃)— | H | S | —CH₂CH(CH₃)CH₂— |
| CH₃ | S | —CH(CH₃)CH(CH₃)— | Cl | S | —CH₂CH(CH₃)CH₂— |
| OCH₃ | S | —CH(CH₃)CH(CH₃)— | OCH₃ | S | —CH₂CH(CH₃)CH₂— |
| H | S | —CH₂C(CH₃)₂— | H | S | —CH(C₂H₅)CH₂— |
| Cl | S | —CH₂C(CH₃)₂— | Cl | S | —CH(C₂H₅)CH₂— |
| CF₃ | S | —CH₂C(CH₃)₂— | OCH₃ | S | —CH(C₂H₅)CH₂— |
| H | S | —CH(CH₃)C(CH₃)₂— | H | S | —CH₂CH₂CH₂CH(CH₃)— |
| Br | S | —CH(CH₃)C(CH₃)₂— | Cl | S | —CH₂CH₂CH₂CH(CH₃)— |
| OCH₃ | S | —CH(CH₃)C(CH₃)₂— | H | S | —CH(CH₃)CH(C₂H₅)— |

By means of this procedure but substituting the 2-(oxoalkyl) derivatives of Preparation F wherein Y=O and S for the 2-acetonyl substituted heterocyclic compounds used herein, the corresponding 2-heterocyclic substituted 3-lower alkyl quinoxaline-1,4-dioxides are produced.

PREPARATION A

Compounds of the formula

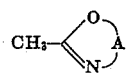

are prepared by the general procedure of Wenkert, J. Am. Chem. Soc. 57, 1079 (1935) which comprises heating equimolar amounts of acetic acid and the appropriate alkanolamine (HO-A-NH₂) to about 160° to 200° C. until one molar equivalent of water is removed. The residue is then distilled in vacuo to give the cyclized compound. The following compounds are thus prepared:

| A | A |
|---|---|
| -(CH₂)₃- | -CH(CH₃)C(CH₃)₂- |
| -CH(CH₃)CH₂- | -CH(CH₃)CH₂CH₂CH₂- |
| -CH₂CH(CH₃)- | -CH(C₂H₅)CH(CH₃)- |
| -CH(C₂H₅)CH₂- | -C(CH₃)₂CH₂- |
| -CH(CH₃)CH(CH₃)- | -CH₂C(CH₃)₂- |

PREPARATION B

2-Methyl Cyclic Amidines

The following compounds are prepared according to the procedure of Riebsomer, J. Am. Chem. Soc. 70, 1629 (1948) which comprises adding benzene to an equimolar mixture of the appropriate alkylenediamine (H₂N-A-NHR₁) and acetic acid and distilling the benzene and by-product water through a packed 4-foot column. The benzene is returned to the reaction flask and heating continued at a temperature of from about 150° C. to about 220° C. until 1 mole of water is collected. The product is then distilled from the reaction flask in vacuo.

In this manner, the compounds listed below are prepared:

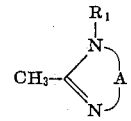

| A | R₁ | A | R₁ |
|---|---|---|---|
| —(CH₂)₄— | H | —CH₂C(CH₃)(C₂H₅)— | H |
| —(CH₂)₅— | H | —CH₂C(CH₃)(C₂H₅)— | CH₃* |
| —(CH₂)₂— | C₂H₅ | —(CH₂)₄— | CH₃ |
| —(CH₂)₂— | n-C₃H₇ | —(CH₂)₄— | n-C₃H₇ |
| —(CH₂)₂— | i-C₃H₇ | —(CH₂)₅— | C₂H₅ |
| —(CH₂)₂— | n-C₄H₉ | —CH₂C(CH₃)₂— | H |
| —(CH₂)₃— | n-C₃H₇ | —CH₂CH(C₂H₅)— | H |
| —(CH₂)₃— | i-C₄H₉ | —CH₂CH(C₂H₅)— | CH₃* |
| —CH(CH₃)CH(CH₃)— | H | —CH₂CH(C₂H₅)— | n-C₃H₇* |
| —CH(CH₃)CH(CH₃)— | C₂H₅* | —CH(CH₃)CH₂— | H |
| —CH₂CH(CH₃)CH₂CH₂— | H | —CH₂C(CH₃)₂CH₂— | CH₃* |
| —CH₂CH(CH₃)CH₂CH₂— | CH₃* | —CH₂C(CH₃)₂CH₂— | n-C₃H₇* |
| —CH₂CH(CH₃)CH₂CH₂— | n-C₄H₉* | —CH₂CH₂CH(CH₃)— | CH₃ |

*The N-substituted alkylenediamines thus marked are prepared from the corresponding unsubstituted diamine by alkylation with the appropriate alkylbromide (R₁Br). The procedure comprises refluxing a mixture of the alkylenediamine (2.5-3.0 moles) with the appropriate alkylbromide (1.0 mole) for about six to eight hours. The mixture is then cooled, made alkaline and extracted with ether. The ether extracts are dried (K₂CO₃), the ether distilled off and the residue fractionated in vacuo to provide the N-substituted alkylenediamine.

PREPARATION C

2-Methyl-5,6-Dihydro-4H-1,3Thiazine

Thioacetamide (7.6 g., 0.1 mole) and 3-bromopropylamine hydrobromide (21.9 g., 0.1 mole) are thoroughly mixed and heated at 150° to 170° C. for 15 to 20 minutes, then cooled and partitioned between ether and dilute aqueous hydrochloric acid. The aqueous phase is separated, cooled in an ice-bath and fresh ether added (100 ml.). The two phases are vigorously agitated and aqueous sodium hydroxide added until a pH of 10 to 11 is attained. The ether phase is separated, dried over anhydrous sodium sulfate and evaporated to provide the product which is fractionally distilled.

In this manner the following compounds are prepared using the appropriate bromo- or chloroalkylamine:

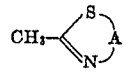

| A | A |
|---|---|
| -(CH₂)₄- | -CH₂CH(CH₃)- |
| -(CH₂)₃- | -C(CH₃)₂CH₂- |
| -CH₂CH(C₂H₅)- | -CH₂C(CH₃)₂- |
| -CH(C₂H₅)CH₂- | -CH(CH₃)CH(CH₃)- |
| -CH(CH₃)CH₂- | -CH₂CH₂CH₂CH(CH₃)- |
| -C(CH₃)₂CH₂CH₂- | -CH(CH₃)CH(C₂H₅)- |

PREPARATION D

The 2-methyl substituted cyclic thioamidates listed below are prepared by the procedure of Saulmann, Ber. 33, 2635 (1900). The procedure comprises refluxing thioacetamide (0.1 mole) with excess (10 molar) of the appropriate alkylene dichloride (Cl-A-Cl), or alkylene dibromide for about eight hours or until elimination of the hydrogen halide ceases. The excess alkylene dihalide is then removed by distillation, the residue mixed with a large volume of water and heated. Hydrochloric acid is added to achieve solution of the residue. The solution is filtered, the filtrate neutralized with ammonium hydroxide and the product extracted with ether. The ethereal solution is dried (anhydrous sodium sulfate), decolorized, if necessary, and evaporated to give the product.

The following compounds are prepared in this manner:

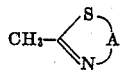

-(CH₂)₃-
-(CH₂)₄-
-(CH₂)₅-
-CH₂CH₂CH(C₂H₅)-
-CH₂C(CH₃)₂CH₂-
-CH(CH₃)CH(CH₃)-
-CH₂CH(C₂H₅)CH₂-
-CH(CH₃)C(CH₃)₂-
-CH₂CH(CH₃)CH₂-
-CH₂CH₂CH₂CH(CH₃)-

PREPARATION E

Ethyl(3-Methylquinoxaline-2-Formimidate)-1,4-Dioxide Hydrochloride

A solution of 2-cyano-3-methylquinoxaline-1,4-dioxide (0.1 mole) in dry ethanol (5.3 g., 0.12 mole) and dry ether (50 ml.) is saturated with dry hydrogen chloride while maintaining the temperature below 10° C. The mixture is then stirred overnight at room temperature under a dry nitrogen atmosphere. The solid is collected by filtration (ether is added to the reaction mixture, if necessary, prior to filtration) washed with ether and dried.

The following compounds are thus prepared:

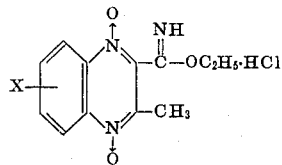

| X | X |
|---|---|
| Cl | CH₃ |
| Br | OCH₃ |
| F | CF₃ |

Repetition of this procedure but replacing ethanol with methanol, n-propanol or n-butanol produces the lower alkyl imido ethers.

The free imido ethers are obtained by adding the hydrochloride to an excess of 33 percent aqueous potassium carbonate under good cooling and vigorous stirring. The imido ether is extracted with ether, the ether solution dried and evaporated to dryness.

In like manner, the 2-cyano-3-lower alkyl quinoxaline-1,4-dioxides of Preparation G are converted to the corresponding imido ether hydrochlorides.

PREPARATION F

2-Acetonylthiazole

To a solution of 2-methylthiazoline (4.95 g., 0.05 mole) in tetrahydrofuran (100 ml.) at −78° C. is added n-butyllithium (3.2 g., 0.05 mole) and the mixture stirred for 1 hour. Acetyl chloride (3.93 g., 0.05 mole) is then added dropwise to the mixture while holding the temperature below −70° C. The mixture is stirred for 1 hour following completion of addition after which it is allowed to warm to room temperature then filtered. The solvent is removed under reduced pressure and the residue distilled in vacuo to provide the product.

By means of this procedure, the 2-methyl substituted heterocyclic compounds of Preparations A, B, C and D are converted to the corresponding 2-(oxoalkyl)- derivatives of formula III

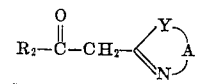

wherein R₂ is methyl, ethyl, n-propyl, n-butyl and isobutyl by substituting the appropriate alkanoic acid chloride (R₂-COCl) for acetyl chloride.

PREPARATION G

2-Cyano-3-Loweralkylquinoxaline-1,4-Dioxides

The general procedure comprises reacting the appropriate acylacetonitrile reactant (R₂-CO-CH₂-CN) with an equimolar amount of the appropriate benzofuroxan reactant in methanol in the presence of an equimolar amount of sodium methoxide. The mixture is refluxed for three hours, the solvent removed under reduced pressure and the residue crystallized from a suitable solvent such as chloroform-methanol.

In this manner, the following compounds are prepared:

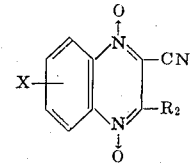

| X | R₂ | X | R₂ | X | R₂ |
|---|---|---|---|---|---|
| F | CH₃ | H | n-C₃H₇ | CF₃ | n-C₄H₉ |
| CF₃ | CH₃ | Cl | n-C₃H₇ | H | t-C₄H₉ |
| H | C₂H₅ | F | n-C₃H₇ | Cl | t-C₄H₉ |
| Cl | C₂H₅ | OCH₃ | n-C₃H₇ | OCH₃ | t-C₄H₉ |
| Br | C₂H₅ | CF₃ | n-C₃H₇ | H | i-C₃H₇ |
| F | C₂H₅ | CH₃ | n-C₃H₇ | Cl | i-C₃H₇ |
| OCH₃ | C₂H₅ | H | n-C₄H₉ | F | i-C₃H₇ |
| CH₃ | C₂H₅ | Cl | n-C₄H₉ | CH₃ | i-C₃H₇ |
| CF₃ | C₂H₅ | OCH₃ | n-C₄H₉ | OCH₃ | i-C₃H₇ |

What is claimed is:
1. A compound having the formula

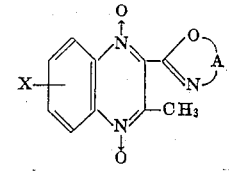

wherein X is selected from the group consisting of hydrogen, chloro, bromo, fluoro, methyl, methoxy and trifluoromethyl; and A is alkylene of from two to five carbon atoms which places at least two carbon atoms between the N and O atoms to which it is attached.

2. A compound according to claim 1 wherein A is alkylene of from two to five carbon atoms which places two carbon atoms between the N and O atoms to which it is attached.

3. A compound according to claim 1 wherein A is alkylene of from two to five carbon atoms which places three carbon atoms between the N and O atoms to which it is attached.

4. The compound of claim 2 wherein X is hydrogen and A is $-CH_2CH_2-$.

5. A compound according to claim 2 wherein X is chloro and A is $-CH_2CH_2-$.

6. The compound of claim 3 wherein X is hydrogen and A is $-(CH_2)_3-$.

* * * * *